(12) United States Patent
Okazaki et al.

(10) Patent No.: US 9,377,657 B2
(45) Date of Patent: Jun. 28, 2016

(54) LIQUID CRYSTAL DISPLAY DEVICE

(71) Applicant: Japan Display Inc., Tokyo (JP)

(72) Inventors: Kengo Okazaki, Tokyo (JP); Yoshinori Aoki, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 41 days.

(21) Appl. No.: 14/547,166

(22) Filed: Nov. 19, 2014

(65) Prior Publication Data

US 2015/0138464 A1      May 21, 2015

(30) Foreign Application Priority Data

Nov. 20, 2013   (JP) .................................. 2013-240188

(51) Int. Cl.
| | | |
|---|---|---|
| *G02F 1/1343* | (2006.01) | |
| *G02F 1/133* | (2006.01) | |
| *G02F 1/1362* | (2006.01) | |
| *G09G 3/36* | (2006.01) | |
| *G02F 1/1368* | (2006.01) | |

(52) U.S. Cl.
CPC ........ *G02F 1/134336* (2013.01); *G02F 1/1368* (2013.01); *G02F 1/13306* (2013.01); *G02F 1/13624* (2013.01); *G02F 1/136286* (2013.01); *G09G 3/3614* (2013.01); *G09G 3/3648* (2013.01); *G02F 2001/134345* (2013.01); *G02F 2001/136222* (2013.01); *G09G 2300/0443* (2013.01); *G09G 2300/0452* (2013.01); *G09G 2320/0209* (2013.01); *G09G 2320/0247* (2013.01)

(58) Field of Classification Search
CPC .................................................. G02F 1/134336
See application file for complete search history.

(56) References Cited

U.S. PATENT DOCUMENTS

| | | | |
|---|---|---|---|
| 2010/0328360 A1 | 12/2010 | Miyashita | |
| 2012/0280896 A1* | 11/2012 | Yamashita | ........... G09G 3/3607 345/88 |
| 2014/0204321 A1* | 7/2014 | Koh | .................. G02F 1/133514 349/109 |

FOREIGN PATENT DOCUMENTS

JP          4877363 B2    12/2011

* cited by examiner

*Primary Examiner* — Michael Caley
*Assistant Examiner* — Edmond Lau
(74) *Attorney, Agent, or Firm* — Typha IP LLC

(57) ABSTRACT

A liquid crystal display device includes: pixel electrodes arranged in respective sub-pixels arrayed in a matrix, plural image signal lines extending in a column direction of the matrix, and supplied with image signals, pixel transistors which are switches arranged in the respective sub-pixels, and supply the image signals to the pixel electrodes, and scanning signal lines extending in a row direction of the matrix, and control conduction of the pixel transistors. The pixel electrodes aligned in a direction along which the image signal lines extend are connected to either of two adjacent image signal lines with six sub-pixels as one period. The pixel electrodes corresponding to five of the six sub-pixels are connected to one of the two adjacent ones of the image signal lines, and the pixel electrode corresponding to one sub-pixel is connected to the other of the two adjacent ones of the image signal lines.

12 Claims, 15 Drawing Sheets

LIQUID CRYSTAL DISPLAY DEVICE

CROSS-REFERENCE TO RELATED APPLICATION

The present application claims priority from Japanese application JP2013-240188 filed on Nov. 20, 2013, the content of which is hereby incorporated by reference into this application.

BACKGROUND OF THE INVENTION

1. Field of the Invention

The present invention relates to a liquid crystal display device.

2. Description of the Related Art

As a display device of an information communication terminal such as a computer and a television receiver, liquid crystal display devices are extensively used. The liquid crystal display device changes an electric field to change an orientation of a liquid crystal composition confined between two substrates, and controls the transmission degree of light passing through the two substrates and the liquid crystal composition to display an image. In order to change the electric field, a voltage corresponding to a gradation value of each pixel is applied to a pixel electrode through a pixel transistor of each pixel.

If the liquid crystal composition is continuously applied with a voltage of the same polarity for a long time, the liquid crystal composition chemically changes, and is deteriorated. For that reason, in the liquid crystal display device, it is general to display the image by so-called "inversion drive" which conducts driving while inverting polarities between pixel electrodes and a counter electrode opposed to the pixel electrodes.

The inversion drive includes frame inversion drive in which the respective pixels in a certain frame have the same polarity, line inversion drive having the same polarity in a horizontal direction, column inversion drive having the same polarity in a vertical direction, dot inversion drive in which pixels of the same polarity are shaped in a checkered pattern, and pixel inversion drive in which pixels of the same polarity are shaped in a checkered pattern on a pixel basis (one pixel by RGB).

In general, it is difficult to completely eliminate a luminance difference between a case in which a positive electrode is applied and a case in which a negative electrode is applied, in the inversion drive, and there is known that flicker appears in the frame inversion drive, and stripes caused by eye movement appear in the line inversion and the column inversion drive. Also, since the polarity of a drain signal is the same in one frame in the frame inversion drive and the column inversion drive, capacitive and leaky crosstalk is likely to occur, and the dot inversion or pixel inversion drive is desirable from the viewpoint of image quality.

Japanese Patent No. 4877363 discloses the inversion drive of the liquid crystal display device having sub-pixels of four colors.

SUMMARY OF THE INVENTION

There is a liquid crystal display device having four-color display of pseudo RGBW in a configuration of pixels each having three sub-pixels in which two sub-pixels are R (red) and G (green), and the remaining one sub-pixel is any one of B (blue) and W (white). In the liquid crystal display device having four-color display of the pseudo RGBW, for example, as illustrated in FIGS. 11A and 11B, in the pixel inversion drive to swap the polarity every three lines, W sub-pixels indicated by W are all − (negative) polarity in odd frames of FIG. 11A, and W sub-pixels indicated by W are all + (positive) polarity in even frames of FIG. 11B. Also, as illustrated in FIGS. 12A and 12B, likewise, in the dot inversion drive in which the polarity is swapped every one line, W sub-pixels are all negative polarity in odd frames of FIG. 12A, and W sub-pixels are all positive polarity in even frames of FIG. 12B. If the polarity of the sub-pixels of a certain color becomes all the same, flick is visibly recognized in the display, and causes the image quality to be deteriorated.

The present invention has been made in view of the above-mentioned circumstances, and therefore an object of the present invention is to enhance the image quality of a liquid crystal display device, particularly a liquid crystal display device in which each pixel is configured by three sub-pixels which emit light of four colors.

According to the present invention, there is provided a liquid crystal display device, including: pixel electrodes arranged in respective sub-pixels arrayed in a matrix in a display area; a plurality of image signal lines extending in a column direction of the matrix, and supplied with image signals; pixel transistors which are switches arranged in the respective sub-pixels, and supply the image signals to the pixel electrodes; and scanning signal lines extending in a row direction of the matrix, and control conduction of the pixel transistors, in which the pixel electrodes aligned in a direction along which the image signal lines extend are connected to either of two adjacent ones of the image signal lines with six sub-pixels as one period, and the pixel electrodes corresponding to five of the six sub-pixels are connected to one of the two adjacent ones of the image signal lines through respective ones of the pixel transistors, and the pixel electrode corresponding to the remaining one of the six sub-pixels is connected to the other of the two adjacent ones of the image signal lines through corresponding one of the pixel transistor.

Also, in the liquid crystal display device according to the present invention, three of the continuous sub-pixels aligned in the direction along which the image signal lines extend configure one pixel, the pixels include a first pixel including the three sub-pixels that transmit respective lights of three kinds of wavelength regions having a first color, a second color, and a third color, and a second pixel including the three sub-pixels that transmit respective lights of three kinds of wavelength regions having the first color, the second color, and a fourth color, the first pixel and the second pixel are arranged in a checkered pattern so as to be adjacent from each other, and the one sub-pixel connected to the other of the two adjacent ones of the image signal lines is a sub-pixel corresponding to a color filter of the third color or the fourth color.

Also, in the liquid crystal display device according to the present invention, the image signals supplied to the image signal lines may be pixel inversion drive that swaps polarity every three continuous scanning signal lines, or dot inversion drive that swaps polarity every scanning signal line.

Also, in the liquid crystal display device according to the present invention, all of the pixel electrodes aligned in a direction along which the image signal line extends may be connected to one of the image signal lines on one end of the display area.

Also, in the liquid crystal display device according to the present invention, the number of image signal lines may be larger than the number of columns of the sub-pixels arrayed in the display area by one.

Also, in the liquid crystal display device according to the present invention, the image signal line on one end of the display area may be connected to the adjacent image signal line at the same potential.

Also, in the liquid crystal display device according to the present invention, an orientation of the electrodes that connect the pixel transistors and the pixel electrodes may be parallel or perpendicular to the image signal lines on a boundary of a semiconductor film.

DETAILED DESCRIPTION OF THE INVENTION

Figure 1:
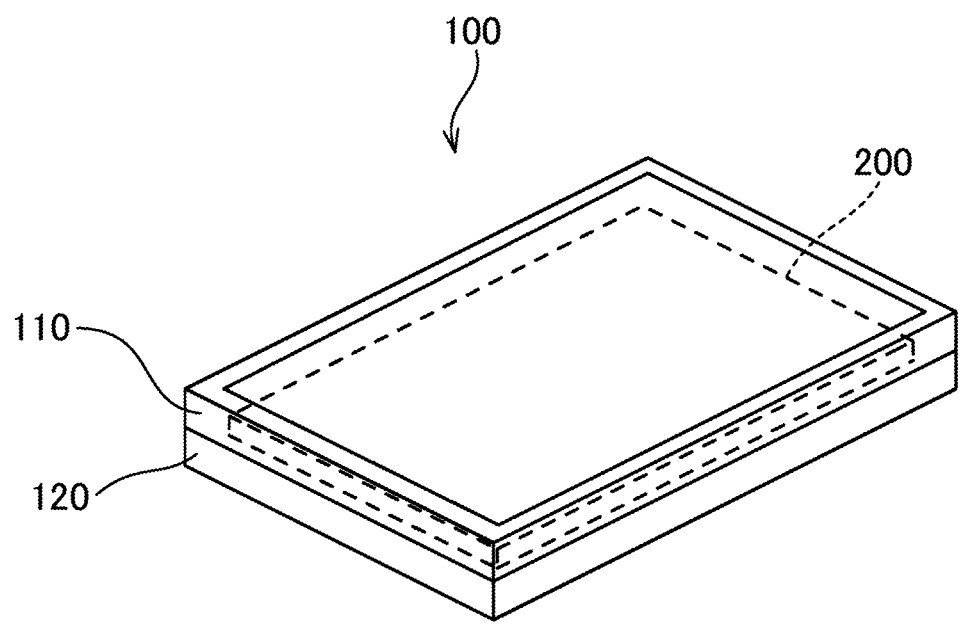
FIG. 1 is a diagram schematically illustrating a liquid crystal display device according to an embodiment of the present invention.

Hereinafter, the respective embodiments of the present invention will be described with reference to the drawings. The disclosure is merely exemplary, and those skilled in the art can suitably modify each of the above embodiments, and such modifications are also encompassed within the scope of the invention as long as they fall within the spirit of the invention. Also, in order to more clarify the illustration, the drawings may schematically illustrate widths, thicknesses, and shapes of the respective parts as compared with real configurations, but those illustrations are merely exemplary, and do not limit the interpretation of the present invention. Also, in the present specification and the respective drawings, the same elements as those already described in the drawings are denoted by identical symbols, and a detailed description thereof will be appropriately omitted.

FIG. 1 is a diagram schematically illustrating a liquid crystal display device 100 according to an embodiment of the present invention. As illustrated in the figure, the liquid crystal display device 100 includes a liquid crystal display panel 200 fixedly sandwiched between an upper frame 110 and a lower frame 120.

Figure 2:
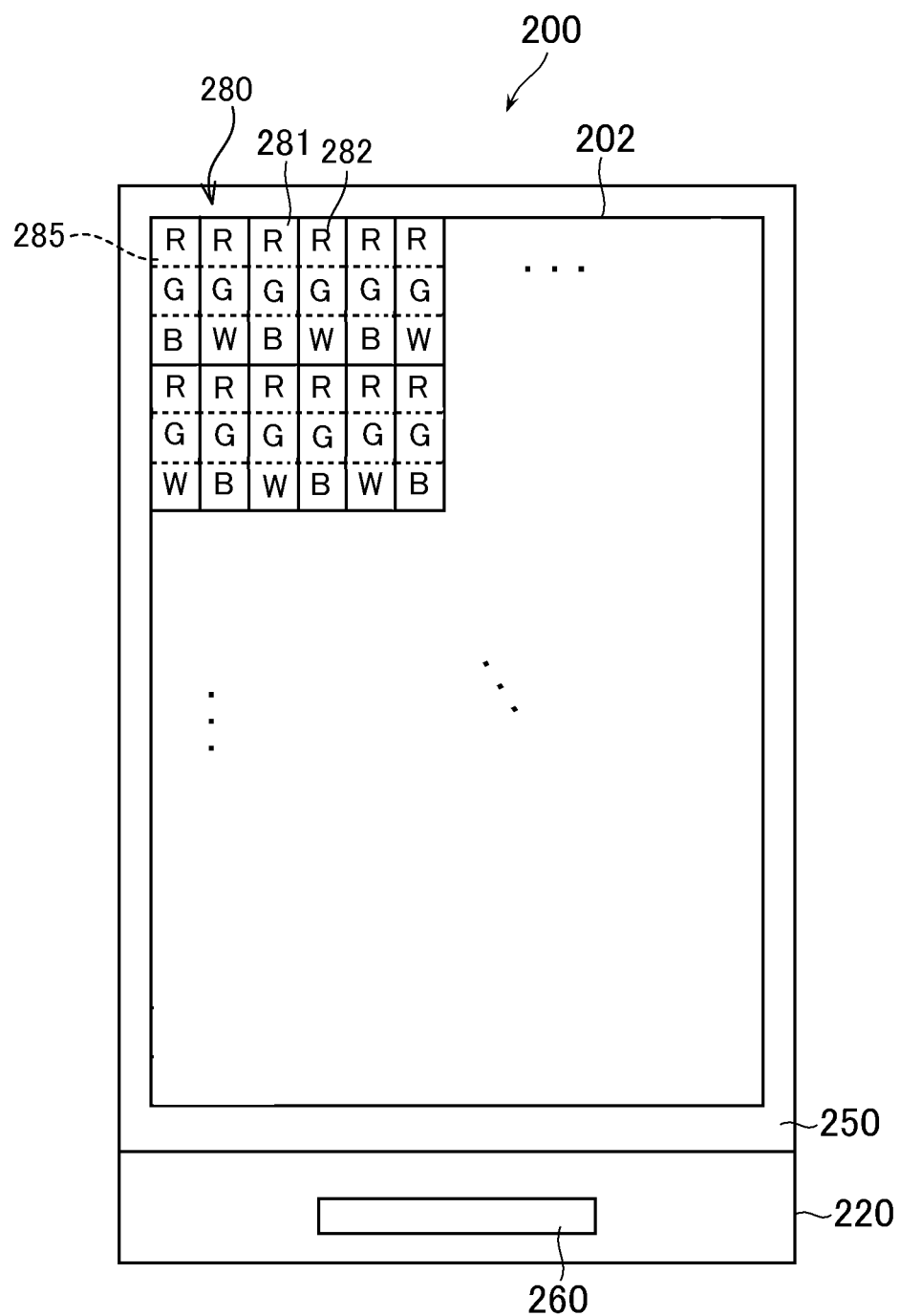
FIG. 2 is a plan view schematically illustrating a liquid crystal display panel of FIG. 1.

FIG. 2 illustrates a configuration of the liquid crystal display panel 200 of FIG. 1. The liquid crystal display panel 200 includes two substrates of a TFT (thin film transistor) substrate 220 and a color filter substrate 250, and a space between those substrates is filled with a liquid crystal composition not shown. The TFT substrate 220 has sub-pixels 285 arranged in a matrix in a display area 202, and three sub-pixels 285 aligned in a vertical direction configure one pixel 280. The color filter substrate 250 has color filters that transmit lights of wavelength regions of R (red), G (green), B (blue), and W (white) in correspondence with the respective sub-pixels 285. The color filter W may transmit lights of at least two wavelength regions of the lights of wavelength regions of RGB, and the color filter W may be transparent filter, or nothing may be formed to emit the lights of wavelength regions of RGB. Also, the pixels 280 are each configured by three sub-pixels 285 continuous in a column (vertical) direction, and as illustrated in FIG. 2, and have two types of first pixels 281 that each emit the lights of three colors of RGB as a first color, a second color, and a third color, and second pixels 282 that each emit the lights of three colors of RGW as the first color, the second color, and a fourth color. Also, R and G are arrayed in a row (horizontal) direction with the same color, and B and W are alternately arrayed in the row direction. In this embodiment, RGB and RGW are used as the combination of the three sub-pixels 285, but RGY (yellow), or the combination of the other colors can be used. Also, a drive IC (integrated circuit) 260 is mounted on the TFT substrate 220, which is a driver circuit that applies a potential to scanning signal lines 221 for electrically connecting a source and a drain of each of pixel transistors 226 (refer to FIG. 3A) arranged in the respective sub-pixels 285, and also applies voltages corresponding to gradation values of the sub-pixels 285 to image signal lines 222 of the respective pixel transistors 226.

Figure 3A:
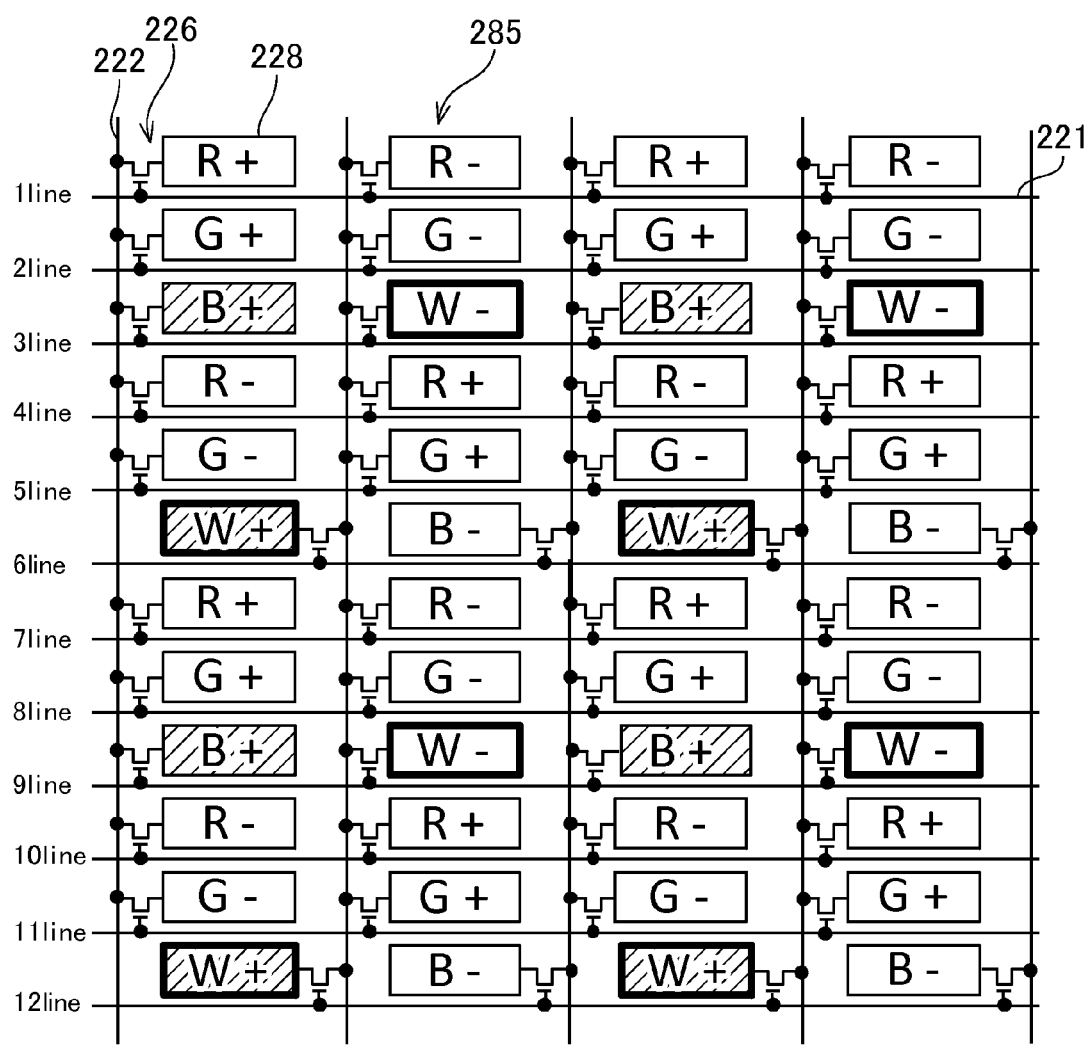
FIG. 3A is a diagram illustrating the polarities of respective pixel electrodes in an odd frame of pixel inversion drive.
Figure 3B:
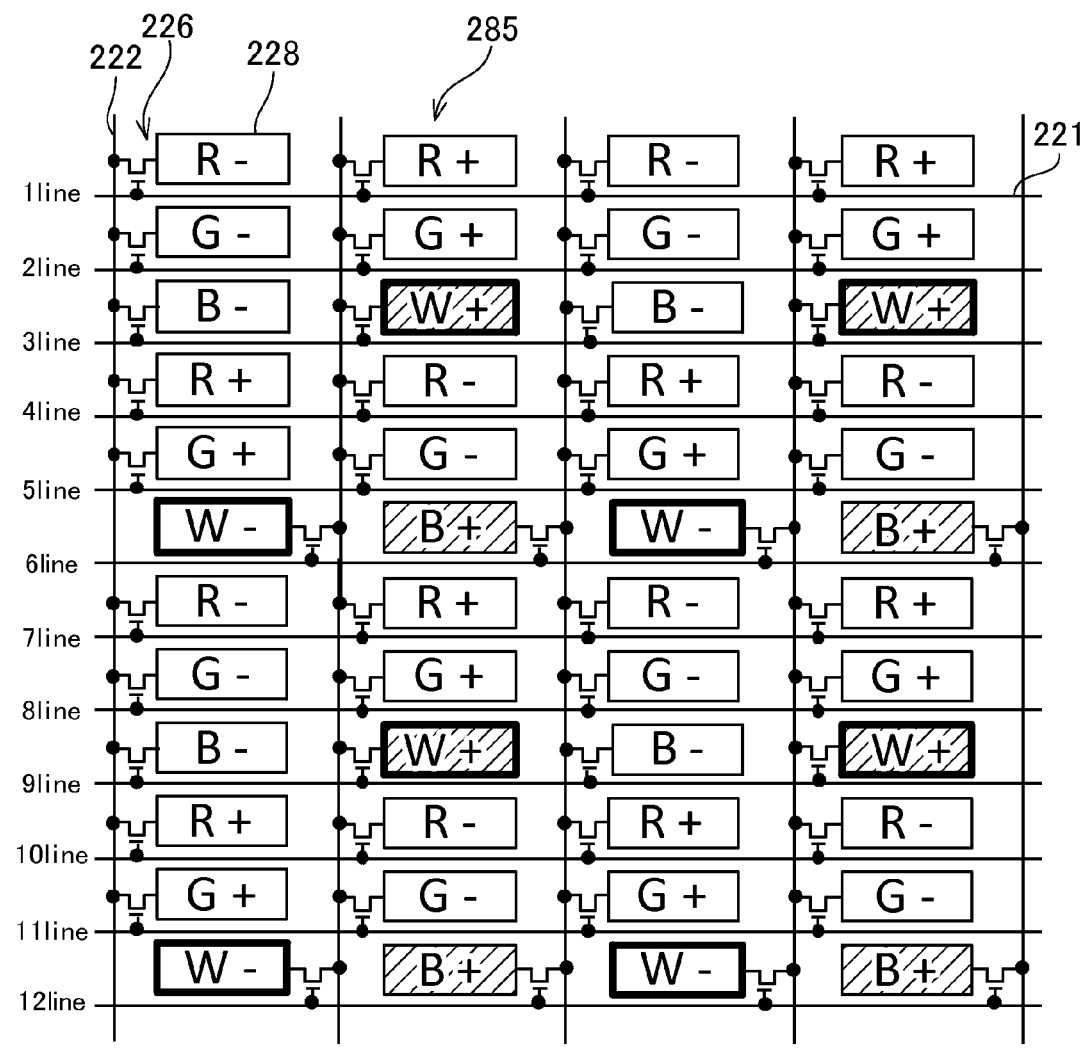
FIG. 3B is a diagram illustrating the polarities of the respective pixel electrodes in an even frame of the pixel inversion drive.

FIGS. 3A and 3B are diagrams illustrating the polarity of respective pixel electrodes 228 of pixel inversion drive that changes the polarity every three lines. In those drawings, for facilitation of the illustration, the number of sub-pixels 285 is reduced. As illustrated in those drawings, the respective pixel electrodes 228 are connected with the image signal lines 222 extending in the column (vertical) direction of the drawing through the pixel transistors 226, and the conduction of the pixel transistors 226 is controlled by the scanning signal lines 221 extending in the row (horizontal) direction. The pixel transistors 226 connected to (6×n)-th line (n is a natural number) of the scanning signal lines 221 are arranged to be connected to the image signal lines 222 extending to the right side of the pixel electrodes 228, and the pixel transistors 226 connected to the other lines are connected to the image signal lines 222 extending to the left side of the pixel electrodes 228. That is, the sub-pixels connected to the image signal lines 222 extending to the right side of the pixel electrodes 228 are sub-pixels corresponding to the color filter of B which is the third color, or W which is the fourth color.

In general, in the liquid crystal display device, the potentials of the respective pixel electrodes 228 are rewritten for each of time periods called "frame", and an orientation of the liquid crystal composition is controlled according to a change in potential difference from a counter electrode (not illustrated) to display an image. In the respective pixel electrodes 228, the polarity of the potential difference from the counter electrode is made different for each of the frames by application of voltage. FIG. 3A illustrates the polarity of the respective pixel electrodes 228 in the odd frame, and FIG. 3B illustrates the polarity of the respective pixel electrodes 228 in the even frame. In those drawings, for illustration, the colors of the color filters corresponding to the respective sub-pixels 285, and the polarities of the inversion display are illustrated on the pixel electrodes 228.

As illustrated in FIG. 3A, in the odd frames, the polarities of the sub-pixels 285 of W color have two kinds of positive polarity and negative polarity having the same number. Also, the polarity of the sub-pixels 285 of the W color at a distance shortest to each other is different from each other. The polarity of the sub-pixels 285 of the B color is the same as that of the W color. Also, in FIG. 3B, like FIG. 3A, the polarity of the sub-pixels 285 of the W color and the B color has two kinds of the positive polarity and the negative polarity having the same number. Also, the polarity of the sub-pixels 285 of the W color at a distance shortest to each other is different from each other, and the polarity of the sub-pixels 285 of the B color at a distance shortest to each other is also different from each other. For that reason, because the image signal is supplied without biasing the polarities of the W color and the B color, flicker caused by those colors is suppressed, and higher-quality image can be displayed.

Therefore, in this embodiment, the pixel electrodes 228 of five sub-pixels are continuously connected to one image signal line 222 in a six-sub-pixel period, and the pixel electrode 228 of one sub-pixel, that is, the pixel electrode 228 of a (6×n)-th line is connected to the other image signal line 222. Therefore, the sub-pixels 285 of the same color do not have the same polarity at the same time, and the higher-quality image can be displayed.

Figure 4:
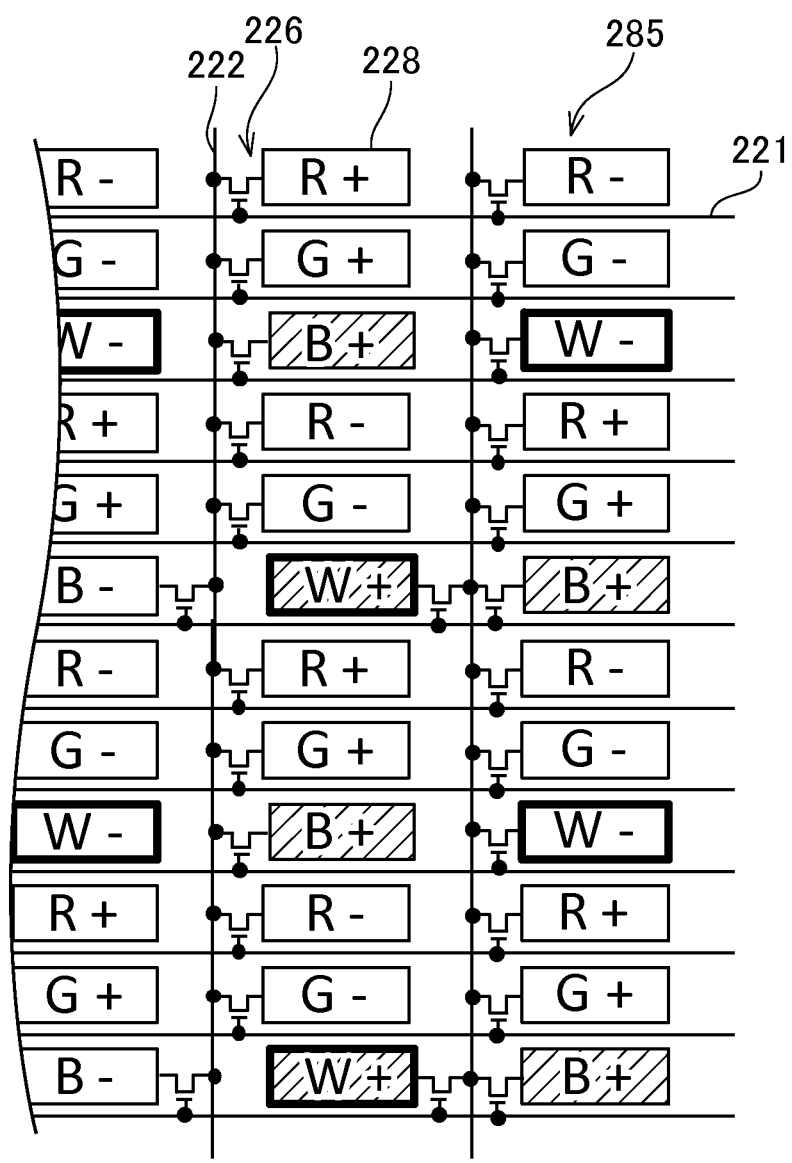
FIG. 4 is a diagram illustrating an example of connection of pixel electrodes of rightmost sub-pixels and image signal lines in a display area.

In this example, as described above, the pixel transistors 226 connected to the (6×n)-th line of the scanning signal line 221 are arranged to be connected to the image signal lines 222 extending to the right side of the pixel electrodes 228. Therefore, the image signal line 222 also needs to be arranged on the rightmost of the display area 202. For that reason, in the configurations of FIGS. 3A and 3B, the image signal lines 222 of the number larger than the number of the columns of the sub-pixels 285 by one are required, and the drive IC 260 also outputs the signal according to the number of the image signal lines 222. In this example, as illustrated in FIG. 4, even if the pixel electrodes 228 of the sub-pixels 285 on the rightmost of the display area 202 is the pixel electrodes 228 of the sub-pixels 285 on the (6×n)-th line, the pixel electrodes 228 are connected to the same side as that of the other pixel electrodes 228, that is, to the left side, and the number of image signal lines 222 may be made identical with the number of columns of the sub-pixels 285. With this configuration, the above advantages can be obtained while the number of image signal lines 222, and the number of output signals from the drive IC 260 are kept identical with the number of sub-pixels 285.

Figure 5:
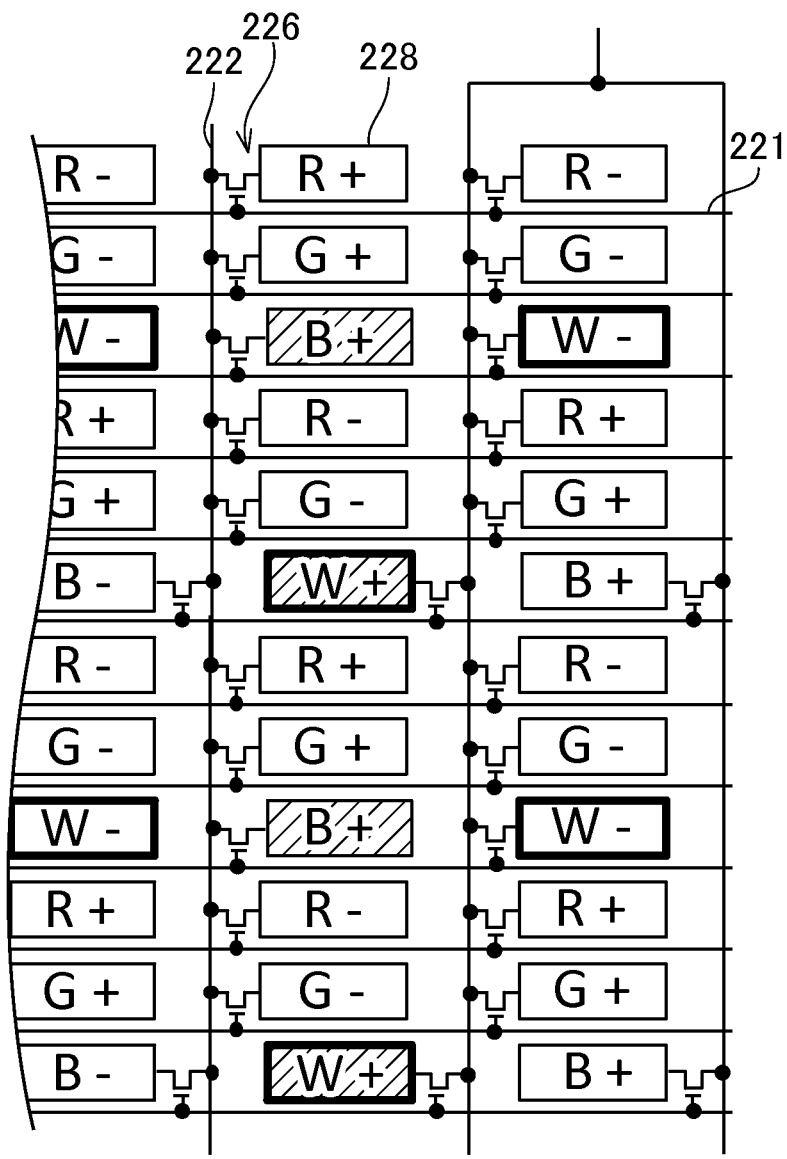
FIG. 5 is a diagram illustrating an example of the connection of the pixel electrodes of the rightmost sub-pixels and the image signal lines in the display area.

Also, as illustrated in FIG. 5, even if the number of image signal lines 222 is made larger than the number of columns of the sub-pixels 285 by one, even when electric connection is made so that the image signal line 222 on the rightmost has the same potential as that of the image signal line 222 adjacent to the rightmost image signal line 222, and the number of signals output from the drive IC 260 is made identical with the number of columns of the sub-pixels 285, the same advantages as those described above can be obtained. In the configuration illustrated in FIG. 5, as compared with the configuration illustrated in FIG. 4, because the pixel transistors 226 of the sub-pixels 285 on the (6×n)-th line are arranged in same direction (left side in FIG. 5) as that of the image signal lines 222, the advantages that the pixel transistors 226 have the same characteristics are obtained.

Figure 6A:
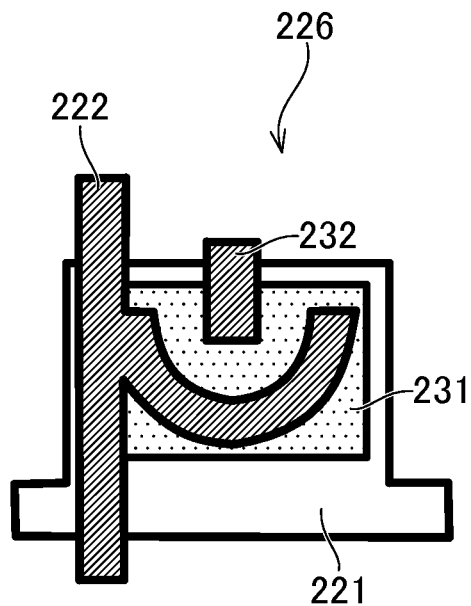
FIG. 6A is a diagram schematically illustrating pixel transistors connected to an image signal line on a left side, and having source lines parallel to the image signal lines.
Figure 6B:
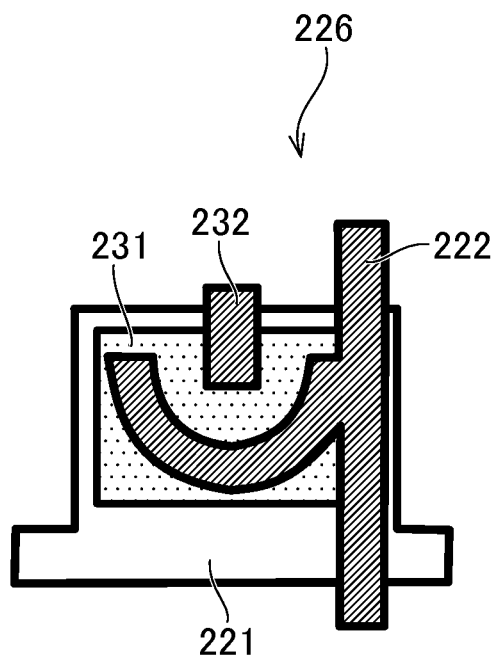
FIG. 6B is a diagram schematically illustrating pixel transistors connected to the image signal line on a right side, and having source lines parallel to the image signal lines.

FIGS. 6A and 6B are diagrams illustrating the pixel transistors 226 used for the W sub-pixel and the B sub-pixel according to this embodiment. FIG. 6A illustrates a pixel transistor 226 connected to the image signal line 222 on a left side of the pixel electrodes 228, and FIG. 6B illustrates a pixel transistor 226 connected to the image signal line 222 on a right side of the pixel electrodes 228. As illustrated in those figures, a semiconductor film 231 formed on an upper side of the scanning signal line 221 controls conduction between a source electrode 232 that connects the pixel transistor 226 to the pixel electrode 228, and the image signal line 222 according to the potential of the scanning signal line 221.

Figure 7A:
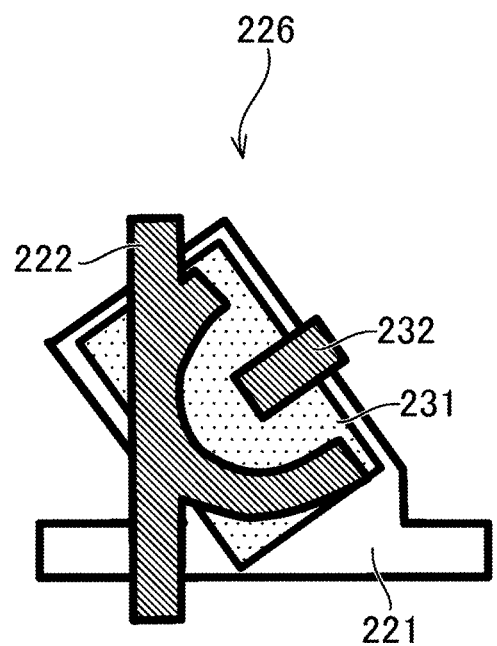
FIG. 7A is a diagram schematically illustrating pixel transistors connected to the image signal lines on the left side, and having the source lines extending obliquely to the image signal lines.
Figure 7B:
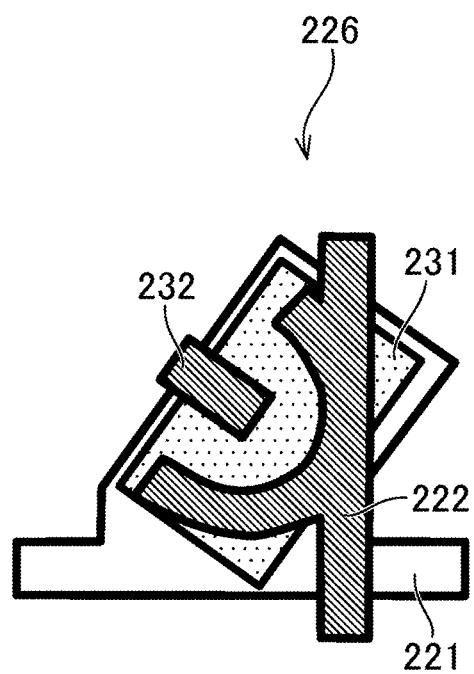
FIG. 7B is a diagram schematically illustrating pixel transistors connected to the image signal lines on the right side, and having the source lines extending obliquely to the image signal lines.

In the W sub-pixel and the B sub-pixel, as illustrated in those figures, there are a case in which the pixel transistor 226 is formed on the right side of the pixel electrode 228, and a case in which the pixel transistor 226 is formed on the left side of the pixel electrode 228. For example, as illustrated in FIGS. 7A and 7B, when the source electrode 232 that connects the pixel transistors 226 to the pixel electrodes 228 extends obliquely on a boundary overlapping with the semiconductor film 231, and a film formation position is displaced in a forming process of the pixel transistor 226, the pixel transistor 226 attached differently between the right and left is different in a displacement direction, and a luminance difference caused by an increase in the difference of the characteristic occurs, and may be visibly recognized as strips.

Figure 8A:
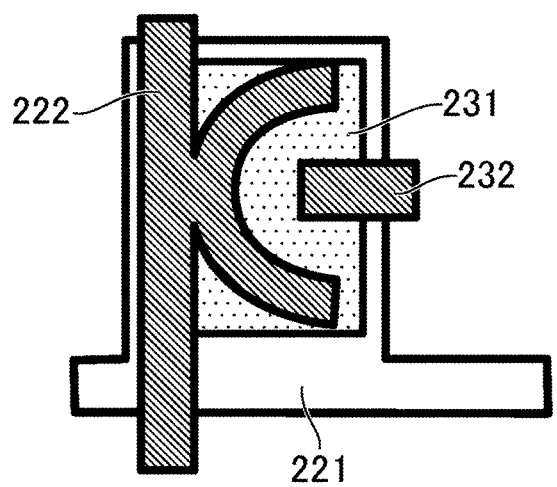
FIG. 8A is a diagram schematically illustrating pixel transistors connected to the image signal lines on the left side, and having the source lines perpendicular to the image signal lines.
Figure 8B:
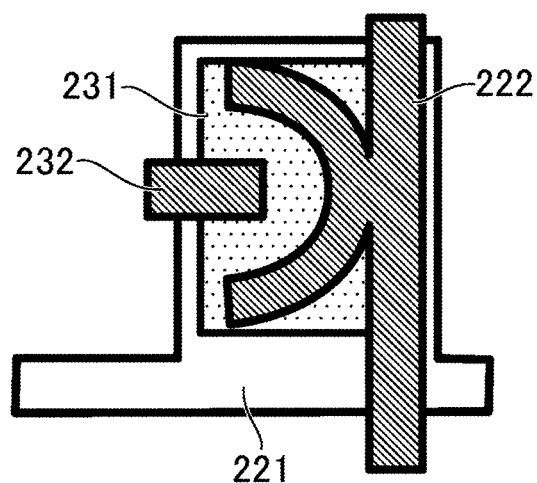
FIG. 8B is a diagram schematically illustrating pixel transistors connected to the image signal lines on the right side, and having the source lines perpendicular to the image signal lines.

However, as illustrated in FIGS. 6A and 6B, when the source electrode 232 extends in parallel to a direction of extending the image signal line 222 on the boundary overlapped with the semiconductor film 231, even if the film formation position is displaced in the formation process of the pixel transistor 226, the difference of the characteristic of the pixel transistor 226 can be reduced, and the display quality can be improved. Also, even if the source electrode 232 is not parallel to the direction of extending the image signal line 222, but perpendicular to the direction of extending the image signal line 222 as illustrated in FIGS. 8A and 8B, the same advantages can be obtained. In the R sub-pixels and the G sub-pixels, because all of the pixels 280 are connected to the image signal lines 222 on the same side, the pixel transistor 226 having the oblique source electrode 232 as illustrated in FIGS. 7A and 7B may be provided, or as in the W sub-pixels and the B sub-pixels, the source electrode 232 that extends in parallel to or perpendicular to the direction of extending the image signal lines 222 may be provided.

Figure 9A:
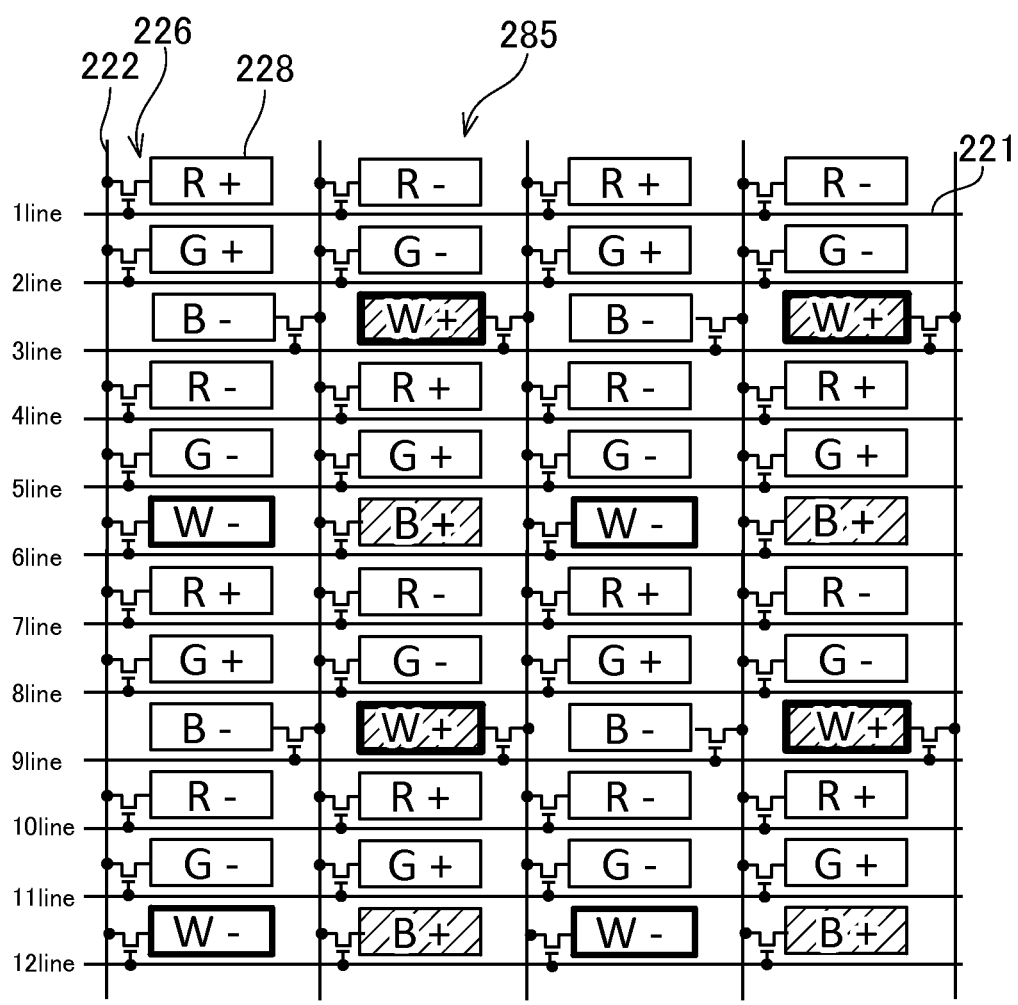
FIG. 9A is a diagram illustrating the polarity of the respective pixel electrodes in an odd frame according to a first modification.
Figure 9B:
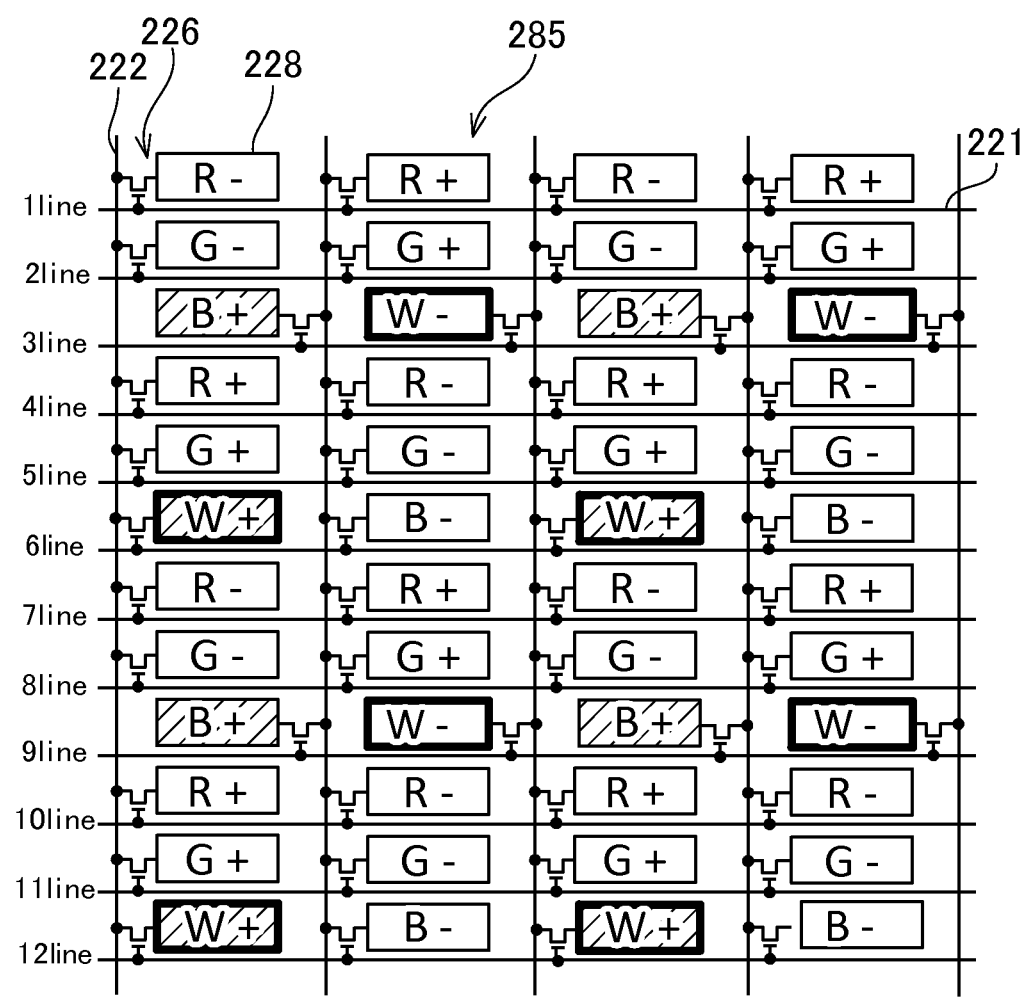
FIG. 9B is a diagram illustrating the polarity of the respective pixel electrodes in an even frame according to the first modification.

FIGS. 9A and 9B are diagrams illustrating a first modification of the above embodiment, viewed in the same manner as that of FIGS. 3A and 3B. A difference from the above embodiment resides in that the pixel transistors 226 connected to the image signal lines 222 extending to the right side of the pixel electrodes 228 are arranged on the third line, and every six lines from the third line, and the other configuration is the same as that of the above embodiment. Even in this arrangement, the pixel transistors 226 connected to the image signal lines 222 extending to the right side of the pixel electrodes 228 are disposed every six sub-pixels 285. As a result, the polarity of the sub-pixels 285 of W color and B color has two kinds of the positive polarity and the negative polarity having the same number. Also, the polarity of the sub-pixels 285 of the W color at a distance shortest to each other is different from each other, and the polarity of the sub-pixels 285 of the B color at a distance shortest to each other is also different from each other. For that reason, because the image signal is supplied without biasing the polarities of the W color and the B color, flicker caused by those colors is suppressed, and higher-quality image can be displayed.

Figure 10A:
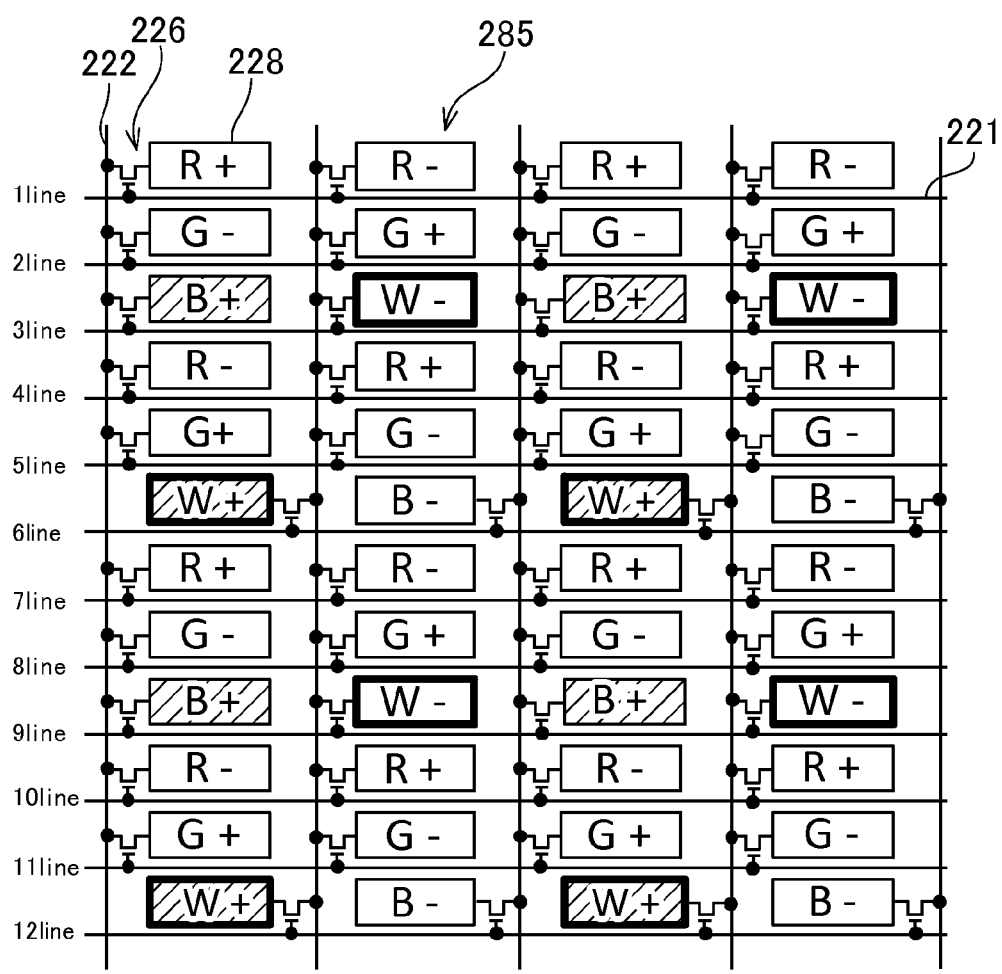
FIG. 10A is a diagram illustrating the polarity of the respective pixel electrodes in an odd frame according to a second modification.
Figure 10B:
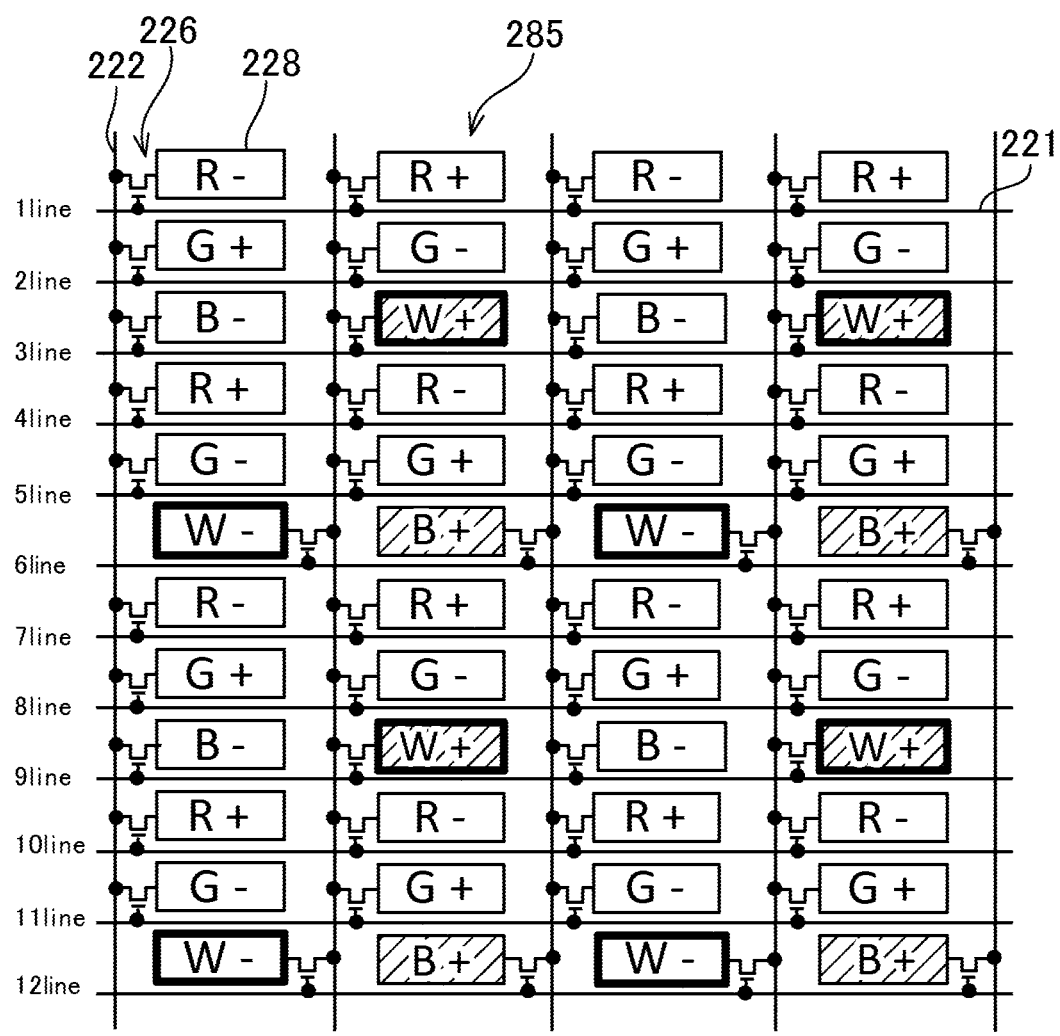
FIG. 10B is a diagram illustrating the polarity of the respective pixel electrodes in an even frame according to the second modification.
Figure 11A:
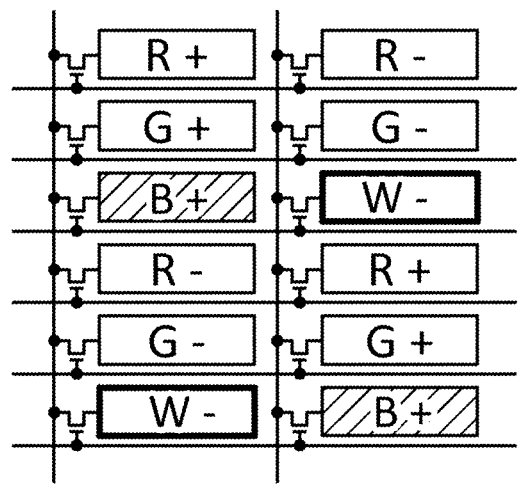
FIG. 11A is a diagram illustrating the polarity of the respective pixel electrodes in an odd frame in a conventional pixel inversion drive.
Figure 11B:
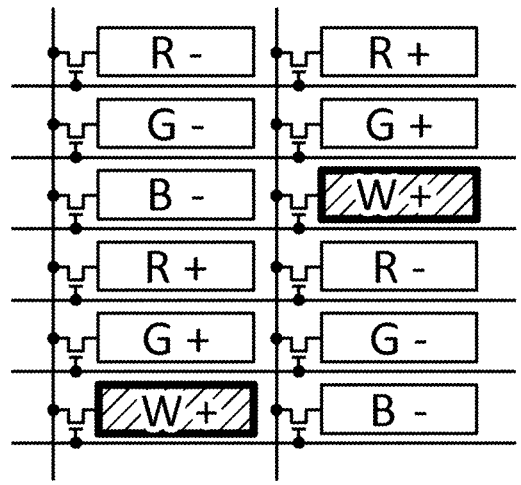
FIG. 11B is a diagram illustrating the polarity of the respective pixel electrodes in an even frame in the conventional pixel inversion drive.
Figure 12A:
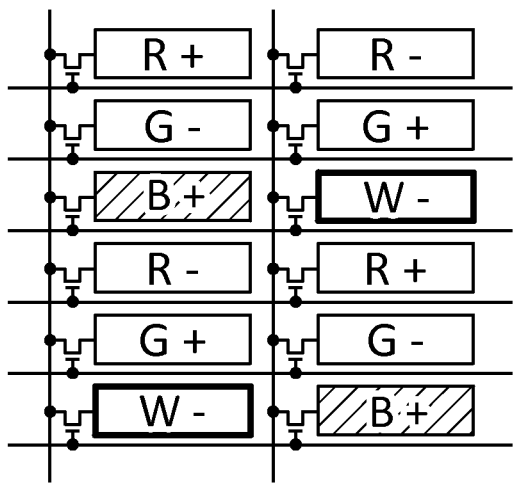
FIG. 12A is a diagram illustrating the polarity of the respective pixel electrodes in an odd frame in a conventional dot inversion drive.
Figure 12B:
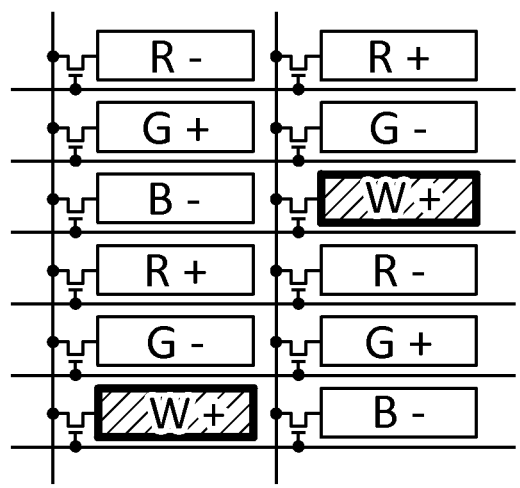
FIG. 12B is a diagram illustrating the polarity of the respective pixel electrodes in an even frame in the conventional dot inversion drive.

FIGS. 10A and 10B are diagrams illustrating a second modification of the above embodiment, viewed in the same manner as that of FIGS. 3A and 3B. The second modification is different from the above embodiment in that the above embodiment is the pixel inversion drive in which the polarity is swapped every three lines whereas the second modification is the dot inversion drive in which the polarity is swapped every line, and the other configuration is identical therebetween. As illustrated in those drawings, even in the dot inversion drive, the polarity of the sub-pixels 285 of the W color and the B color has two kinds of the positive polarity and the negative polarity having the same number. Also, the polarity of the sub-pixels 285 of the W color at a distance shortest to each other is different from each other, and the polarity of the sub-pixels 285 of the B color at a distance shortest to each other is also different from each other. For that reason, because the image signal is supplied without biasing the polarities of the W color and the B color, flicker caused by those colors is suppressed, and higher-quality image can be displayed.

In the above embodiments, a case in which two kinds of pixels of RGB and RGW for four colors of RGBW are formed has been described. However, the combination of the colors is not limited to this example, and in the pixels having the three sub-pixels, the respective sub-pixels can be applied to the liquid crystal display device that emits the light of one wavelength region among four kinds of wavelength regions (four colors).

Those skilled in the art can conceive various changes and modifications without departing from the spirit of the present invention, and those changes and modifications are also encompassed within the scope of the present invention. For example, those skilled in the art can suitably modify the above embodiments by addition, deletion, or design change of components, or by addition, omission, or condition change of processes, and such modifications are also encompassed within the scope of the invention as long as they fall within the spirit of the invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   pixel electrodes arranged in respective sub-pixels arrayed in a matrix in a display area;
   a plurality of image signal lines extending in a column direction of the matrix, and supplied with image signals;
   pixel transistors which are switches arranged in the respective sub-pixels, and supply the image signals to the pixel electrodes; and
   scanning signal lines extending in a row direction of the matrix, and control conduction of the pixel transistors,
   wherein the pixel electrodes aligned in a direction along which the image signal lines extend are connected to either of two adjacent ones of the image signal lines with six sub-pixels as one period, and
   wherein the pixel electrodes corresponding to five of the six sub-pixels are connected to one of the two adjacent ones of the image signal lines through respective ones of the pixel transistors, and the pixel electrode corresponding to the remaining one of the six sub-pixels is connected to the other of the two adjacent ones of the image signal lines through corresponding one of the pixel transistor.

2. The liquid crystal display device according to claim 1,
   wherein three of the continuous sub-pixels aligned in the direction along which the image signal lines extend configure one pixel,
   wherein the pixels include a first pixel including the three sub-pixels that transmit respective lights of three kinds of wavelength regions having a first color, a second color, and a third color, and a second pixel including the three sub-pixels that transmit respective lights of three kinds of wavelength regions having the first color, the second color, and a fourth color,
   wherein the first pixel and the second pixel are arranged in a checkered pattern so as to be adjacent from each other, and
   wherein the one sub-pixel connected to the other image signal line is a sub-pixel corresponding to a color filter of the third color or the fourth color.

3. The liquid crystal display device according to claim 1,
   wherein the image signals supplied to the image signal lines are pixel inversion drive that swaps polarity every three continuous scanning signal lines.

4. The liquid crystal display device according to claim 1,
   wherein the image signals supplied to the image signal lines are dot inversion drive that swaps polarity every scanning signal line.

5. The liquid crystal display device according to claim 1,
   wherein all of the pixel electrodes aligned in a direction along which the image signal line extends are connected to one of the image signal lines on one end of the display area.

6. The liquid crystal display device according to claim 1,
   wherein the number of image signal lines is larger than the number of columns of the sub-pixels arrayed in the display area by one.

7. The liquid crystal display device according to claim 6,
   wherein the image signal line on one end of the display area is connected to the adjacent image signal line at the same potential.

8. The liquid crystal display device according to claim 1,
wherein an orientation of the electrodes that connect the pixel transistors and the pixel electrodes are parallel or perpendicular to the image signal lines on a boundary of a semiconductor film.

9. A liquid crystal display device, comprising:
sub-pixels arranged in a matrix in a display area;
pixel electrodes, pixel transistors, and color filters which are arranged in the respective sub-pixels;
a plurality of image signal lines that extends in a column direction of the matrix, and is supplied with image signals; and
scanning signal lines that extend in a row direction of the matrix, and control conduction of the pixel transistors,
wherein the sub-pixels are classified into sub-pixels of R, sub-pixels of G, sub-pixels of B, and sub-pixels of W by the color filters,
wherein the image signal lines have first, second, and third image signal lines arrayed in order,
wherein the sub-pixels of a first column are arrayed in a direction along which the image signal lines extend in the stated order of RGBRGW, between the first image signal line and the second image signal line,
wherein the sub-pixels of a second column are arrayed in the direction along which the image signal lines extend in the stated order of RGWRGB, between the second image signal line and the third image signal line, and
wherein the sub-pixels of RGB of the first column are connected to the first image signal line through respective ones of the pixel transistors, and the W sub-pixels of the first column are connected to the second image signal line through respective ones of the pixel transistors.

10. The liquid crystal display device according to claim 9,
wherein the sub-pixels of RGW of the second column are connected to the second image signal line through respective ones of the pixel transistors, and the B sub-pixels of the second column are connected to the third image signal line through respective ones of the pixel transistors.

11. The liquid crystal display device according to claim 9,
wherein the W sub-pixels of the first column are supplied with a signal of a first polarity, and
wherein the W sub-pixels of the second column are supplied with a signal of a second polarity opposite to the first polarity.

12. The liquid crystal display device according to claim 9,
wherein n (n>3) image signal lines are provided, and sub-pixels of RGBW of an n-th column adjacent to an n-th image signal line are connected to the n-th image signal line through respective ones of the pixel transistors.

* * * * *